United States Patent Office 3,362,661
Patented Jan. 9, 1968

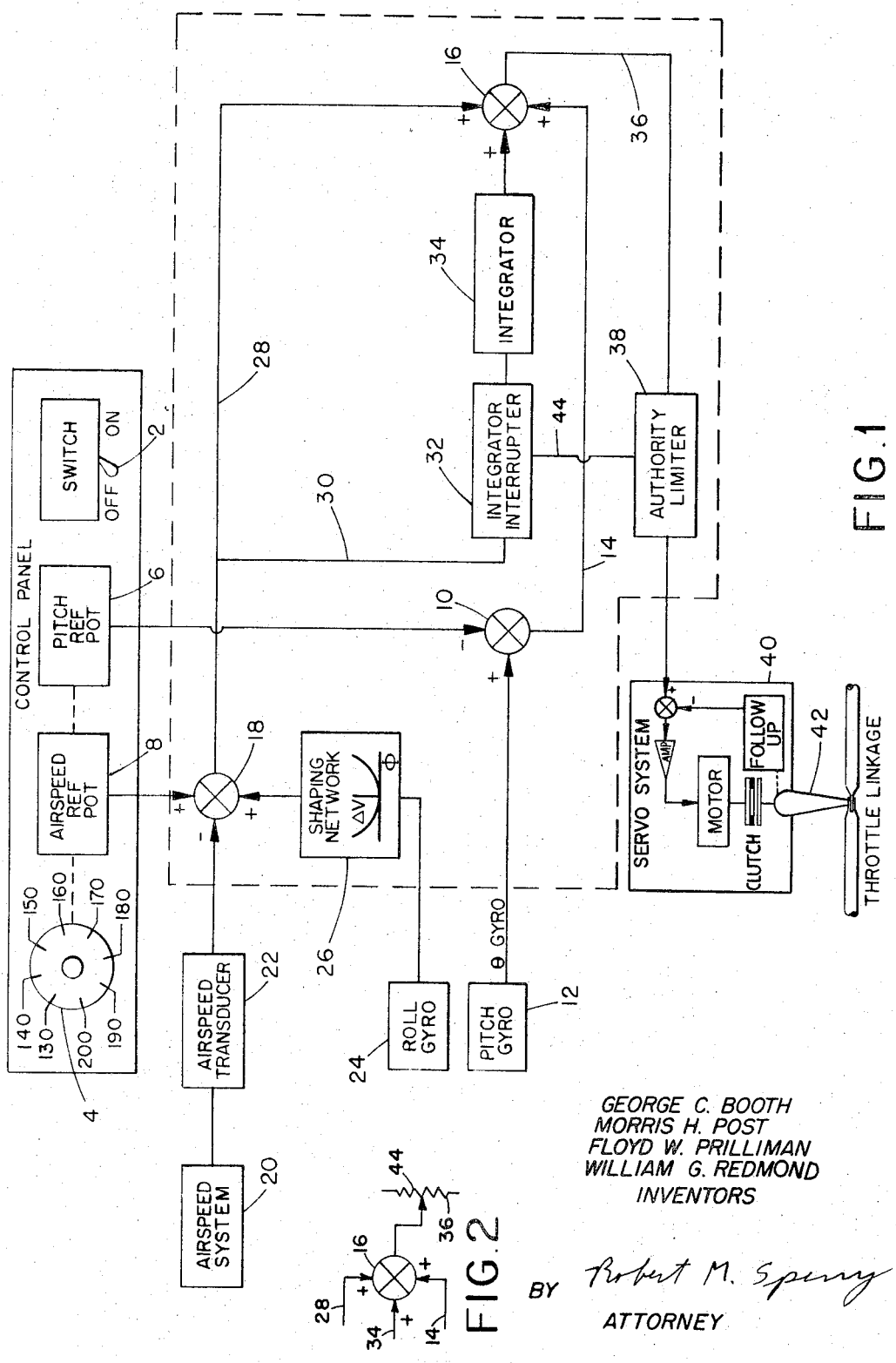

3,362,661
AUTOTHROTTLE
George C. Booth, Irving, Floyd W. Prilliman, Dallas, Morris H. Post, Bedford, and William G. Redmond, Jr., Arlington, Tex., assignors to LTV Aerospace Corporation, Dallas, Tex., a corporation of Delaware
Filed June 14, 1965, Ser. No. 463,839
10 Claims. (Cl. 244—77)

ABSTRACT OF THE DISCLOSURE

This invention relates to a speed-sensing autothrottle including means for compensating for changes in attitude and for preventing stalling during banking of the aircraft.

---

The invention relates to automatic throttle systems for aircraft and the like and is particularly directed to automatic throttle systems which sense changes in the speed and attitude of the aircraft and automatically adjust the throttle setting to compensate for such changes.

As is well known, automatic throttle control systems are often employed with automatic pilot or approach control systems to regulate the throttle setting and to allow the human pilot to direct his full attention to other matters. Numerous systems have been proposed heretofore for accomplishing this. However, none of the prior art systems have been entirely satisfactory. It must be recognized that the purpose of an automatic throttle is, normally to maintain a desired airspeed. Since many factors, such as flight path, affect the thrust required to maintain a given airspeed, an automatic throttle system must include means for sensing and compensating for changes in such factors. Many prior art automatic throttle systems have included means for sensing indirect parameters, such as the angle of attack of the airplane, normal acceleration or the like an indication of speed. However, these indirect sensing systems are affected by numerous extraneous parameters other than airspeed, such as airplane configuration, vertical air drafts, and the like and often alter airspeed in response to such extraneous parameters where no change in airspeed is desired. In addition, some systems are constructed to attain and hold a "built in" speed. Such systems cannot be adjusted to compenate for varying conditions. Moreover, when an airplane goes into a bank, as when making turns, it is necessary to increase the airspeed slightly in order to prevent buffet or stalling. Most of the prior art automatic throttle systems have ignored this problem. Angle of attack sensing automatic throttle systems inherently provide a speed increase as a function of bank angle. However, the amount of speed increase provided by such systems is often excessive. This is particularly important when the airplane is making an approach for a landing since the airplane must usually make turns at low airspeed, and also since excessive speed attained in such turns may caue overshooting or rough land:ngs.

These disadvantages of the prior art are overcome with the present invention and a novel automatic throttle system is provided which is directly responsive to airspeed and includes means for sensing the bank angle of the airplane and providing an appropriate increase in airspeed. Moreover, to operate the automatic throttle of the present invention, the pilot merely dials the desired airspeed and turns on the system. Furthermore, with the system of the present invention, a range of airspeeds are available to permit the pilot to select any of several airspeeds to meet various conditions.

Accordingly, it is an object of the present invention to provide an improved automatic throttle system.

Another object of the present invention is to provide an improved automatic throttle system which can be set in operation by merely dialing the desired airspeed and turning on the system.

An additional object of the present invention is to provide an improved automatic throttle system which is adjustable to accommodate varying conditions.

A specific object of the present invention is to provide an improved automatic throttle system which senses changes in bank angle and adjusts the airspeed appropriately in response to such changes to prevent stalling.

These and other objects and features of the present invention will be aparent from the following detailed description taken with reference to the figure of the accompanying drawing.

In the drawing:

FIGURE 1 is a diagrammatic representation of an automatic throttle system embodying the present invention, thereafter and FIGURE 2 is a diagrammatic representation of a detail of a modified form of the system of FIG. 1.

In the form of the present invention chosen for purposes of illustration in drawing, FIG. 1 shows an automatic throttle system having an energizing switch 2 and a speed selecting dial 4 which controls the positioning of a pair of potentiometers 6 and 8. As is well known, pitch attitude and airspeed are interrelated and changes in p'tch attitutde must be taken into consideration by the automatic throttle system in order to maintain a desired airspeed. To accomplish this, potentiometer 6 functions as a pitch attitude reference potentiometer and establishes an electrical signal indicative of the pitch attitude which would be proper, under normal level flight conditions, at the airspeed selected by dial 4. This signal is supplied to a pitch comparison circuit 10 which compares this signal with a second electrical signal, developed by pitch attitude gyroscope 12, indicative of the actual pitch attitude. The signals from the pitch reference potentiometer 6 and pitch gyroscope 12 are compared by pitch comparison circuit 10 and any difference is supplied, via conductor 14, to a summing circuit 16.

Potentiometer 8 is a speed reference potentiometer which establishes an electrical signal indicative of the desired airspeed selected by dial 4 and supplies this signal to airspeed comparison circuit 18. The actual airspeed is sensed by su'table means, indicated by block 20, such as static and pitot tubes, which cause an appropriate transducer 22 to establish an electrical signal, indicative of the actual airspeed, and to supply this signal to the airspeed comparison circuit 18.

To compensate for changes in bank angle, an electrical signal, indicative of the bank angle, is derived from the roll gyroscope 24 and is supplied to a computer 26 which determines the airspeed required to prevent stalling at the indicated bank angle and supplies an electrical signal indicative of this required airspeed to the airspeed comparison circuit 18. The airspeed comparison circuit 18 compares the actual airspeed signal, from transducer 22, with the selected airspeed signal, from potentiometer 8, and the required airspeed signal, from computer 26, and establishes an airspeed demand signal which is supplied, via conductor 28, to the summing circuit 16. At the same time, the airspeed demand signal from airspeed comparison circuit 18, and its integral, from ductor 30 and an integrator interrupter circuit 32, to an integrating circuit 34 which determines the integral of the airspeed demand signal and supplies a signal, indicative of this integral, to the summing circuit 16.

Summing circuit 16 adds the airspeed demand signal, from airspeed comparison circuit 18, and its integral, from integrator 34, to the difference signal, from pitch comparison circuit 10, and establishes a throttle control signal, indicative of the total, which is supplied, via conductor 36 and authority limiting circuit 38, to a throttle servosystem, indicated by block 40, to cause the servosystem 40 to appropriately position the throttle 42. The authority limiting circuit is connected by conductor 44 to the integrator interrupter 32 and serves to temporarily interrupt the operation of the system at any time that the throttle control signal from summing circuit 16 could cause the throttle 42 to be moved to a position beyond preselected limits, such as the Military Thrust position.

In operation, the pilot determines a desired airspeed and adjusts dial 4 to indicate this airspeed. Then he places switch 2 in the "ON" position to energize the automatic throttle system. Thereafter, the automatic throttle system will maintain the desired airspeed, making whatever corrections are necessary to compensate for changes in pitch and bank attitude, without further attention from the pilot. Thus, if the airplane is flying in level flight at the selected airspeed and is in the proper attitude for such airspeed, the signal from the pitch attitude gyroscope 12 will be balanced by pitch comparison circuit 10 against the signal from the pitch reference potentiometer 6 and no difference signal will appear on conductor 14. If the pitch attitude changes, the signal from gyroscope 12 will no longer equal the signal from potentiometer 6 and pitch comparison circuit 10 will apply a signal indicative of the difference to summing circuit 16, thereby varying the throttle control signal to cause servosystem 40 to appropriately adjust the position of throttle 42 to compensate for the change in thrust required which would result from the change in pitch attitude.

Similarly, the actual airspeed signal from transducer 22 is balanced by airspeed comparison circuit 18 against the desired airspeed signal from airspeed potentiometer 8. If the actual airspeed is different than the desired airspeed, for any reason, the two signals will not be equal and airspeed comparison circuit 18 will apply a signal indicative of the unbalance to summing circuit 16, varying the throttle control signal to cause servosystem 40 to adjust the position of throttle 42 as required to rebalance the two airspeed signals.

As indicated above, when an airplane goes into a bank, as in making a turn it is often necessary to increase the airspeed slightly in order to prevent buffet or stalling. This is especially true when flying at relatively low speeds, such as during an approach for a landing. Furthermore, the amount of speed increase required to avoid stalling is functionally related to the bank angle. To relieve the pilot of this concern, the automatic throttle system of the present invention senses banking of the airplane and automatically adjusts the throttle setting to provide the necessary change in airspeed. Thus, roll gyroscope 24 senses any change in the bank angle of the airplane and supplies a signal indicative of that change to the bank angle computer 26 which determines the airspeed required to prevent buffet or stall at the indicated bank angle and applies a signal indicative of this airspeed to airspeed comparison circuit 18. The comparison circuit 18 adds the signal from computer 26 to the selected airspeed signal from potentiometer 8 and compares this total with the actual airspeed signal from transducer 22. If any difference is found, a signal indicative of such difference is supplied to summing circuit 16 to vary the throttle control signal in a manner to cause servosystem 40 to appropriately adjust the position of throttle 42.

It will be obvious to those skilled in the art that the thrust developed at the throttle setting established by the signals from potentiometers 6 and 8 will cause the airplane to fly at the airspeed selected on dial 4 only for one particular set of conditions, for example, for an airplane of medium load flying in level flight attitude on a standard day. If any of these conditions are varied, the throttle setting determined by the signals from potentiometers 6 and 8 will result in thrust causing the airplane to fly at some airspeed other than the desired airspeed selected on dial 4. Thus, if the airplane is heavily loaded, more thrust will be required to maintain a desired airspeed than if the airplane is moderately loaded and, if potentiometers 6 and 8 are calibrated for a moderately loaded airplane, the throttle setting established by the signals from potentiometers 6 and 8 will not produce sufficient thrust to enable the airplane to fly at the desired airspeed selected on dial 4. Therefore, the airplane will tend to fly at a lower airspeed. However, when this occurs, the signal from transducer 22 will not be equal to the signal from potentiometer 8 and a continuous error signal will be required from comparison circuit 18 to adjust the throttle setting to produce the necessary thrust for maintaining the desired airspeed. In addition, variations in components of the system, such as gyroscope, drift, may result in a similar continuous error signal from comparison circuit 18. These problems are overcome by integrator 34, which receives signals from airspeed comparison circuit 18 via conductor 30 and supplies the integral of such signals to the summing circuit 16. With this arrangement, continuous error signals from comparison circuit 18 will cause a signal to be established by integrator 34 which will be applied through summing circuit 16 to cause servosystem 40 to adjust the position of throttle 42 in a manner to eliminate the error signal. This serves to compensate for deviation from the conditions of calibration of potentiometers 6 and 8 and for variation of circuit components.

In some instances, the throttle control signal from summing circuit 16 may call for movement of the throttle 42 to a position beyond certain preselected limits, such as "Idle" or "Military Thrust." To hold the throttle within these limits, the throttle control signal from summing circuit 16 is passed through authority limiting circuit 38. If the throttle control signal is such as would cause the movement of throttle 42 to exceed such limits, the authority limiting circuit 38 applies a signal to integrator interrupter circuit 32 to temporarily deenergize the integrator 34 and restricts the signal supplied to servosystem 40 to within the preselected limits.

If desired, means may be included in the summing circuit 16 to establish a signal, upon energization of the system by switch 2, which will cause the throttle 42 to be moved to a predetermined position, such as the normal position for level flight, before the automatic throttle system has time to establish a signal based upon the setting of dial 4. It is found that the response time required for the system to assume control at a selected airspeed can be significantly reduced by this expedient. Moreover, if the airplane is to be operated under conditions, such as other gross weights or altitudes, wherein the thrust produced by a given movement of the throttle differs substantially from the conditions under which the circuit is calibrated, means such as potentiometer in FIG. 2, may be included in summing circuit 16 such that the throttle control signal applied to conductor 36 will be an appropriate function of the total of the input signals received by summing circuit 16.

In addition, numerous other variations and modifications may be made without departing from the present invention. Accordingly, it should be clearly understood that the form of the invention described above and shown in the figure of the accompanying drawing is illustrative only and is not intended to limit the scope of the invention.

What is claimed is:

1. An automatic throttle system for aircraft comprising:
first means for establishing a first electrical signal indicative of a desired airspeed;
second means sensing the actual airspeed of said aircraft and establishing a second electrical signal indicative of said actual airspeed;
third means sensing the bank angle of said aircraft and establishing a third electrical signal indicative of the airspeed required to prevent stalling at the sensed bank angle;

a throttle;

a servosystem for positioning said throttle; and means for comparing said first, second, and third electrical signals and supplying a resultant electrical signal to said servosystem to appropriately position said throttle to control the airspeed of said aircraft.

2. An automatic throttle system for aircraft comprising:

first means for establishing a first electrical signal indicative of a desired airspeed;

second means sensing the actual airspeed of said aircraft and establishing a second electrical signal indicative of said actual airspeed;

third means sensing the bank angle of said aircraft and establishing a third electrical signal indicative of the airspeed required to prevent stalling at the sensed bank angle;

a throttle;

a servosystem for positioning said throttle; and means for comparing said first and third electrical signals with said second electrical signal and supplying a resultant electrical signal to said servosystem to appropriately position said throttle to control the airspeed of said aircraft.

3. An automatic throttle system for aircraft comprising:

first means for establishing a first electrical signal indicative of a desired airspeed;

second means sensing the actual airspeed of said aircraft and establishing a second electrical signal indicative of said actual airspeed;

third means sensing the bank angle of said aircraft and establishing a third electrical signal indicative of the airspeed required to prevent stalling at the sensed bank angle;

a throttle;

a servosystem for positioning said throttle;

means for adding said first and third electrical signals, comparing the total with said second electrical signal, and establishing a fourth electrical signal indicative of the result of said comparison; and means supplying said fourth electrical signal to said servosystem to appropriately position said throttle to control the airspeed of said aircraft.

4. An automatic throttle system for aircraft comprising:

first means for establishing a first electrical signal indicative of a desired airspeed;

second means sensing the actual airspeed of said aircraft and establishing a second electrical signal indicative of said actual airspeed;

third means sensing the bank angle of said aircraft and establishing a third electrical signal indicative of the airspeed required to prevent stalling at the sensed bank angle;

a throttle;

a servosystem for positioning said throttle;

means for adding said first and third electrical signals, comparing the total with said second electrical signal, and establishing a fourth electrical signal indicative of the result of said comparison;

means connected to receive and integrate said fourth electrical signal and to establish a fifth electrical signal indicative of the integral of said fourth signal; and means for adding said fourth and fifth electrical signals and supplying the resultant signal to said servosystem to appropriately position said throttle to control the airspeed of said aircraft.

5. An automatic throttle system for aircraft comprising:

first means for establishing a first electrical signal indicative of a desired airspeed;

second means sensing the actual airspeed of said aircraft and establishing a second electrical signal indicative of said actual airspeed;

third means sensing the bank angle of said aircraft and establishing a third electrical signal indicative of the airspeed required to prevent stalling at the sensed bank angle;

means for adding said first and third electrical signals, comparing the total with said second electrical signal, and establishing a fourth electrical signal indicative of the result of said comparison;

integrator means connected to receive and integrate said fourth electrical signal and to establish a fifth electrical signal indicative of the integral of said fourth signal;

means for establishing a sixth electrical signal indicative of a desired pitch attitude;

means sensing the actual pitch attitude of said aircraft and establishing a seventh electrical signal indicative of said actual pitch attitude;

means connected to receive and compare said sixth and seventh signals and to establish an eighth electrical signal indicative of any difference between said sixth and seventh signals;

summing means connected to receive and add said fourth, fifth and eighth signals and to establish a ninth electrical signal indicative of the sum;

a throttle; and a servosystem responsive to said ninth signal to appropriately position said throttle to control the airspeed of said aircraft.

6. The automatic throttle system of claim 5 further comprising:

means responsive to said ninth signal to limit the signal supplied to said servosystem to within predetermined limits.

7. The automatic throttle system of claim 5 further comprising:

means responsive to values of said ninth signal reaching predetermined limits to temporarily deenergize said integrator means.

8. The automatic throttle system of claim 5 further comprising:

means included in said summing means for varying the functional relationship of said ninth signal to the sum of said fourth, fifth and eighth signals.

9. An automatic throttle system for aircraft comprising:

first means for establishing a first electrical signal indicative of a desired airspeed;

second means sensing the actual airspeed of said aircraft and establishing a second electrical signal indicative of said actual airspeed;

third means sensing the bank angle of said aircraft and establishing a third electrical signal indicative of the airspeed required to prevent stalling at the sensed bank angle;

means for adding said first and third electrical signals, comparing the total with said second electrical signal, and establishing a fourth electrical signal indicative of the result of said comparison;

integrator means connected to receive and integrate said fourth electrical signal and to establish a fifth electrical signal indicative of the integral of said fourth signal;

means establishing a sixth electrical signal indicative of a desired pitch attitude;

means sensing the actual pitch attitude of said aircraft and establishing a seventh electrical signal indicative of said actual pitch attitude;

means connected to receive and compare said sixth and seventh signals and to establish an eighth electrical signal indicative of any difference between said sixth and seventh signals;

means connected to receive and add said fourth, fifth and eighth signals and to establish a ninth electrical signal indicative of the sum;

a throttle; and a servosystem responsive to said ninth signal to appropriately position said throttle to control the airspeed of said aircraft.

10. The automatic throttle system of claim 5 wherein said first means is variable over a substantial range of airspeeds.

References Cited

UNITED STATES PATENTS 2,679,365   5/1954   Sparrow _____ 244—77
2,799,461   7/1957   Anderson et al. _____ 244—77

FERGUS S. MIDDLETON, *Primary Examiner*.

UNITED STATES PATENT OFFICE
CERTIFICATE OF CORRECTION

Patent No. 3,362,661  
January 9, 1968

George C. Booth et al.

It is hereby certified that error appears in the above numbered patent requiring correction and that the said Letters Patent should read as corrected below.

Column 2, line 27, for "attitutde" read -- attitude --; line 63, for ", and its integral, from" read -- is supplied via con- --; column 4, line 16, for "gyroscope," read -- gyroscope --.

Signed and sealed this 18th day of February 1969.

(SEAL)  
Attest:

Edward M. Fletcher, Jr.  
Attesting Officer

EDWARD J. BRENNER  
Commissioner of Patents